(12) United States Patent
Kantrowitz et al.

(10) Patent No.: US 7,652,557 B2
(45) Date of Patent: Jan. 26, 2010

(54) OPTICAL TRANSPONDER CONTAINING IDENTIFICATION TAG

(76) Inventors: Allen B. Kantrowitz, 190 Torrey Woods Rd., Williamstown, MA (US) 01267; In Ki Mun, 1 Apple Ct., Nanuet, NY (US) 10958

( * ) Notice: Subject to any disclaimer, the term of this patent is extended or adjusted under 35 U.S.C. 154(b) by 618 days.

(21) Appl. No.: 11/056,808

(22) Filed: Feb. 11, 2005

(65) Prior Publication Data

US 2005/0258939 A1 Nov. 24, 2005

Related U.S. Application Data

(60) Provisional application No. 60/544,712, filed on Feb. 13, 2004, provisional application No. 60/558,629, filed on Apr. 1, 2004.

(51) Int. Cl.
*H04Q 5/22* (2006.01)
(52) U.S. Cl. .................... 340/10.34; 340/10.1
(58) Field of Classification Search ............ 340/10.1, 340/5.8, 5.61, 854.8, 815.5, 815.57, 572.1, 340/572.3; 600/317
See application file for complete search history.

(56) References Cited

U.S. PATENT DOCUMENTS

| | | | |
|---|---|---|---|
| 4,099,050 A | 7/1978 | Sauermann | |
| 4,843,640 A * | 6/1989 | Juengel | 398/109 |
| 5,034,997 A * | 7/1991 | Iwasaki | 398/115 |
| 5,135,569 A | 8/1992 | Mathias | |
| 5,214,409 A | 5/1993 | Beigel | |
| 5,440,300 A | 8/1995 | Spillman, Jr. | |
| 5,641,634 A | 6/1997 | Mandecki | |
| 5,736,332 A | 4/1998 | Mandecki | |
| 5,750,200 A * | 5/1998 | Ogawa et al. | 427/361 |
| 5,833,603 A * | 11/1998 | Kovacs et al. | 600/317 |
| 5,851,488 A * | 12/1998 | Saul et al. | 422/67 |
| 6,100,804 A * | 8/2000 | Brady et al. | 340/572.7 |
| 6,361,950 B1 | 3/2002 | Mandecki | |
| 6,677,852 B1 * | 1/2004 | Landt | 340/10.1 |
| 6,686,158 B2 | 2/2004 | Mandecki | |
| 6,707,539 B2 | 3/2004 | Selinfreund et al. | |
| 6,958,677 B1 * | 10/2005 | Carter | 340/10.1 |
| 7,109,865 B2 * | 9/2006 | Paradiso et al. | 340/572.1 |
| 7,126,755 B2 * | 10/2006 | Moon et al. | 359/569 |
| 2004/0112964 A1 * | 6/2004 | Empedocles et al. | 235/491 |
| 2006/0127088 A1 * | 6/2006 | Guild | 398/50 |

* cited by examiner

*Primary Examiner*—Brian A Zimmerman
*Assistant Examiner*—Nabil H Syed
(74) *Attorney, Agent, or Firm*—Gifford, Krass, Sprinkle, Anderson & Citkowski, P.C.

(57) ABSTRACT

A transponder-equipped ID tag is provided, deriving its power from an incoming interrogating optical signal. The invention relates to a transponder-equipped ID tag that is able to extract power from the incident corresponding interrogation signal and temporarily store it in an internal energy storage device. Optionally, optical transmission is used as either a transmission mode only into the tag or a transmission mode only away from the tag. The inventive optical means of transmission may be combined with either RF transmission into the tag and/or RF transmission away from the tag.

25 Claims, 4 Drawing Sheets

OPTICAL TRANSPONDER CONTAINING IDENTIFICATION TAG

RELATED APPLICATIONS

This application claims priority of U.S. Provisional Patent Applications Ser. No. 60/544,712 filed Feb. 13, 2004 and Ser. No. 60/558,629 filed Apr. 1, 2004, which are incorporated herein by reference.

FIELD OF THE INVENTION

The present invention in general relates to an identification tag and in particular to an optical identification tag and a method of transmitting information both into and out of said tag.

BACKGROUND OF THE INVENTION

Currently, an active area of technological development is the field of radiofrequency (RF) identification (ID) transponder tags. Designers of these tags envision ubiquitous usage throughout commercial, scientific and military spheres. An oft-cited advantage of RFID tags, when compared to optical barcode tags, is the relaxation of the requirement for establishment of direct line of sight between the transponder tag and its corresponding interrogation device. Another advantage of RFID tags, when compared to optical barcode tags, is the large informational space available on the transponder and the design freedom to include supplementary electronic circuitry on the RFID transponder chip to allow informational processing functions beyond simple reporting of an ID number. A further advantage of prior art RFID technologies is that the need for a power source for the informational processing functions and transmission of signals away from the ID tag is satisfied by deriving energy directly from the incoming RF interrogation signal. Said energy can be stored in an energy accumulation device within the tag to provide for short term functioning of the tag's internal mechanisms and to provide energy for an outgoing signal to the corresponding external interrogation device as described, for example, in prior art U.S. Pat. No. 5,053,774 issued to Schuermann.

The prior art describes simple informational functions resident on ID tags such as the simple reporting of a fixed number, for example as detailed in U.S. Pat No. 5,287,113. More elaborate informational functions resident on ID tags also are known such as encryption, computation, and environmental measurement as shown for example in U.S. Pat Nos. 5,532,686; 5,257,011; 6,078,251; and 6,617,963. Moreover, there is ongoing development of external information processing technology in support of RFID tags in order to better extract economic, scientific and social value from RFID technology. Examples of such external information processing include the development of RFID standardized code formats, database systems, means of allocation of RFID serial numbers and the like. Hence, the informational functions resident on the ID tags are associated with corresponding informational functions external to the tags.

Provision of an RF antenna appropriate for the intended wavelength of the RF interrogation signal is required in order to couple energy from said signal into the internal mechanisms of the RFID tag. The necessity of an antenna adds to the size, packaging complexity and cost of each tag and limits the applicability of RFID tags. Thus, there exists a need for coupling the energy of the interrogating signal into an internal energy storage device of the ID tag, without using an RF antenna, so as to minimize the size, packaging complexity and cost of said ID tag.

In the course of design and manufacture of microelectronic circuits and other microminiature devices, it is common practice to provide, in modular fashion, optionally alternative functions co-localized within the same manufactured product. Means is provided to activate, at the time of manufacture or at some later time, each option alone or in combination. Such modular construction lowers the cost of manufacture by allowing a single assembly process to produce products which serve a broad range of end user applications. A problem associated with conventional RFID tags is the lack of certainty as to which of multiple tags in proximity is actually responsive to an input signal. This lack of assurance requires human inspection to confirm tag identity. Several attempts have been made to provide a confirmatory visual signal on an activated RFID tag. Nonetheless, the broadcast nature of radiofrequency signals inevitably suffers from a lack of discrete focus. There exists a need for transponder-equipped ID tags which are manufactured with more than one means of transmission to be optionally activated, alone or in combination, at the time of manufacture or at some later time.

SUMMARY OF THE INVENTION

A transponder-equipped ID tag is provided, deriving its power from an incoming interrogating optical signal. The invention relates to a transponder-equipped ID tag that is able to extract power from the incident corresponding interrogation signal and temporarily store it in an internal energy storage device. Optionally, optical transmission is used as either a transmission mode only into the tag or a transmission mode only away from the tag. The inventive optical means of transmission may be combined with either RF transmission into the tag and/or RF transmission away from the tag.

DETAILED DESCRIPTION OF THE INVENTION

The present invention has utility as an information transmission and identification tag.

While the present invention is detailed herein with respect to optical tag interrogation, it is appreciated that piezoelectric and magnetic input ID tags are also operative herein.

The method of transmitting energy and signals between an ID tag and a corresponding interrogation device, hereafter referred to as "transmission mode", can be distinguished from the informational functions of said tag. The term "transmission mode" is also intended to encompass directionality of transmission as in the terms "transmission mode into the tag" and "transmission mode away from the tag". Transmission modes may include a novel transmission mode alone or in combination with a conventional mode such as RF. For example, a transponder-equipped ID tag with optical transmission modality optionally has a corresponding external interrogation device with powerful magnification lenses and photomultiplier technologies thereby allowing successful interrogation of the tag despite extremely small physical size and low power output of the tag.

As used herein, transponder ID tags are defined to be "informationally equivalent" if they report to their corresponding interrogating devices the same information despite have differing methods of transmission. Availability of such informationally equivalent tags is advantageous to an end user in that they would have available, beyond RF methods, alternate methods of transmission which may be better suited to specific applications and environments. Availability of such informationally equivalent tags is advantageous to end users in that they would have available several varieties of ID tags which are mutually compatible with respect to information content and external pre-interrogation and post-interrogation protocols and uses of the tag information. The directionality associated with an optical beam is intermediate between the area broadcast of an RF signal and the close proximity requirements of conventional barcode readers, and as such affords greater specificity in those tags subject to reading.

With the emergence of an RFID standards authority, a tag according to the present invention is readily tracked to a specific source. Owing to the data-carrying capacity of an optical or hybrid tag according to the present invention, a large number of tags are capable of rapid interrogation. The size of an inventive tag on the scale of 1 to 500 microns allows for the labeling of previously untagable objects. Objects capable of incorporating an inventive tag include currency and production lots of products such as fertilizer, personal care products, plastics, consumer goods, tires, and glasses.

Figure 1:
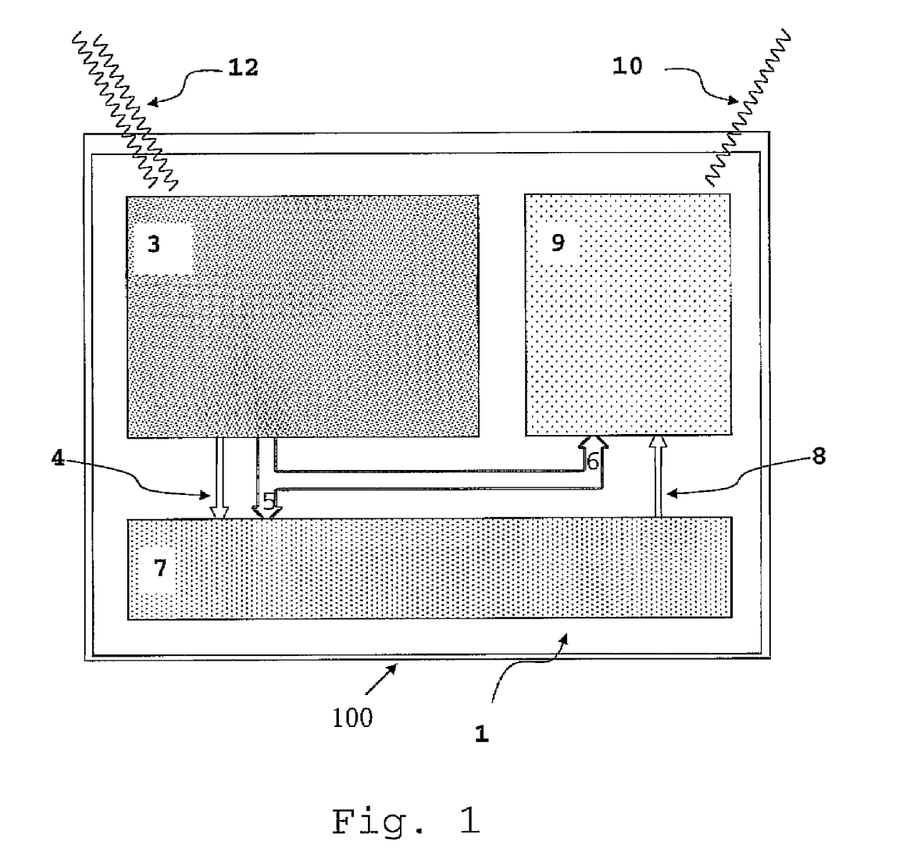
FIG. 1 is a schematic diagram of a preferred embodiment showing an integrated circuit with functions supporting its role as an optical transponder-equipped ID (OID) tag.

Referring now to FIG. 1, a substrate 1 is provided which carries the components of the optical identification (OID) tag. The method of manufacture is preferably from a monolithic integrated circuit; yet various other methods of manufacture are operative herein.

An incoming optical signal 2 is of wavelengths ranging from ultraviolet through visible to infrared. Its external source is monochromatic, for example a laser or photodiode, or polychromatic. An outgoing optical signal 10 is of wavelengths ranging from ultraviolet through visible to infrared. The optical transmitter 9 may be monochromatic, for example a laser or photodiode, or may be polychromatic. There is no requirement that the operating wavelength of the incoming optical signal and the outgoing optical signal be the same or different. Preferably, the outgoing signal is of a wavelength equal to or greater than the incoming signal, else a frequency doubling crystal is used. Both the incoming optical signal 2 and the outgoing optical signal 10 pass through an optional encapsulation 100 of the OID. Said encapsulation is optically transparent at the wavelengths appropriate to the combination of the incoming optical signal 2 and the optical energy receiver 3 as well the combination of the optical transmitter 9 and the outgoing optical signal 10. The encapsulation is optionally partially or completely during use. Optionally, the encapsulation may be opaque with a window transparent at the corresponding wavelengths provided in the field of view of the optical energy receiver 3 and the optical transmitter 9. Optionally, optical filtering (not illustrated) may be incorporated.

The optical energy receiver 3, containing a photosensitive structure, a coupling mechanism, a signal demodulator and a contained energy storage device, permits both power 5, 6 and signal 4 to be derived from the incoming optical energy 2. The power is delivered 5 to the information processing mechanism 7 and is delivered 6 to the optical transmitter 9. The information processing mechanism according to the present invention is encoded with information through techniques conventional to microelectronics and represents either physical or programmed encoding. Tag encoding illustratively includes a mechanism fashioned as an EPROM, uploaded software, and reconfigurable signal and/or power routing. Additional destinations and routings for the power are operative herein. The signal 4 is delivered to the information processing mechanism. Optionally, additional signals (not illustrated) are channeled directly between the optical energy receiver 3 and the optical transmitter 9. It is appreciated that additional destinations (not illustrated) and routings (not illustrated) for the signal are possible but are not included in FIG. 1 for visual simplification.

The information processing mechanism 7 delivers output 8 to the optical transmitter 9 and, optionally, delivers feedback information to the optical energy receiver 3 to alter the characteristics of the optical energy receiver 3. The information processing mechanism 7 may simply deliver an arbitrary number that had been recorded at time of manufacture or recorded at some later time. Alternatively, the information processing mechanism 7 may contain more elaborate informational functions such as encryption, computation, environmental measurement and the like, as are commonly found resident on prior art RFID tags. It is appreciated that conventional information processing mechanisms are operative herein.

The optical transmitter 9 receives power 6 and signal 8 as described above and produces an outgoing optical signal 10 which is detected by an external interrogation device, such as an optical receiver.

Figure 2:
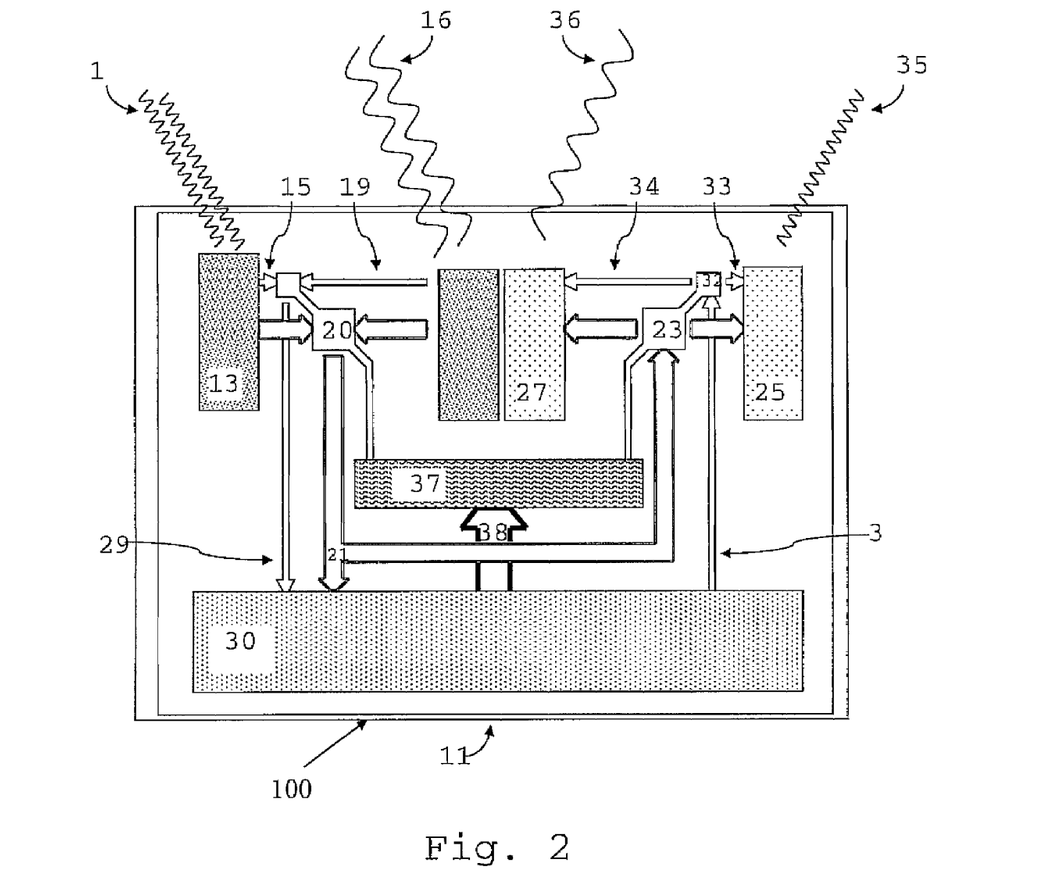
FIG. 2 is a schematic diagram of an alternate embodiment showing an integrated circuit with functions supporting multiple optional application uses as an optical transponder-equipped ID tag, an RFID tag or a combination O/RFID tag.

Another preferred embodiment of the invention is schematically diagrammed in FIG. 2. In this embodiment, the OID functions described in reference to FIG. 1 are augmented by inclusion of an RF transmitter into and away from the tag, optionally a method for enabling any combination of optical and RF reception and transmission. This embodiment will be referred to as an "O/RFID tag".

This preferred embodiment of the invention is schematically diagrammed in FIG. 2. A substrate 11 is provided which carries the components of the O/RFID tag. The method of manufacture is preferably a monolithic integrated circuit; various methods of manufacture are permitted within the scope of the invention.

An incoming optical signal 12 is of wavelengths ranging from ultraviolet through visible to infrared. Its external source is monochromatic, for example a laser or photodiode, or polychromatic. An outgoing optical signal 35 is of wavelengths ranging from ultraviolet through visible to infrared. The optical transmitter 25 may be monochromatic, for example a laser or photodiode, or may be polychromatic. There is no requirement that the operating wavelength of the incoming optical signal and the outgoing optical signal be the same or different. Both the incoming optical signal 12 and the outgoing optical signal 35 pass through an optional encapsulation of the 0/RFID tag. Said encapsulation 100 is optically transparent at the wavelengths appropriate to the combination of the incoming optical signal 12 and the optical energy receiver 13 as well the combination of the optical transmitter 25 and the outgoing optical signal 35. The encapsulation 100 is optionally partially or completely during use. An encapsulation 100 illustratively includes glass. Optionally, the encapsulation 100 is opaque and a transparent window is provided in the field of view of the optical energy receiver 13 and the optical transmitter 25. Optionally, optical filtering may be incorporated. An incoming RF signal 16 is of convenient wavelength as are commonly used in conventional RFID tags. An outgoing RF signal 36 is of convenient wavelength as are commonly used in conventional RFID tags. There is no requirement that the operating wavelength of the incoming RF signal and the outgoing RF signal be the same or different. Both the incoming RF signal 16 and the outgoing RF signal 36 pass trough a conventional antenna connected to the O/RFID tag. As in conventional RFID tags, a single antenna may serve both to receive and transmit RF signals or separate antennas may be provided. As in conventional RFID tags, the antenna or antennas may be integrated onto the same substrate carrying the tag mechanisms or said antennas may optionally be carried beyond the substrate onto adjacent items where it may serve as an extended antenna or as the basis for additional functions such as security indicators and the like.

The optical energy receiver 13, containing a photosensitive structure, a coupling mechanism, a signal demodulator and a contained energy storage device, permits both power 14 and signal 15 to be derived from the incoming optical energy 12. The inventive RF energy receiver 17, connected to an antenna, a coupling mechanism, a signal demodulator and a contained energy storage device, permits both power 18 and signal 19 to be derived from the incoming RF energy 16. Power derived from the optical energy receiver 14 and power derived from the RF energy receiver 18 converge to a common power mechanism 20. Optionally, the function of the energy storage device contained within the optical energy receiver and the function of the energy storage device contained within the RF energy receiver may be combined in a single energy storage device, for example an electrical capacitor, which is located within the common power mechanism 20. The common power mechanism 20 is controlled via an apparatus which is schematically indicated 37. The common power mechanism outputs power which is distributed via power conduits 21, 22, 24, 26 and power distribution nodes 23 throughout the O/RFID tag. Said power distribution nodes 23 are controlled via an apparatus that is schematically indicated 37. Power is delivered 21 to the information processing mechanism 30 and is delivered 22 to a power distribution node 23 and then onward towards 24 the optical transmitter 25 and towards 26 the RF transmitter 27. Additional destinations (not illustrated) and routings (not illustrated) for the power are possible but are not included in FIG. 2 for visual simplification. Signal 15 emerging from the optical energy receiver 13 and signal 19 emerging from the RF energy receiver 17 converge to a common signal mechanism 28 controlled via an apparatus which is schematically indicated 37. From the common signal mechanism 28, information is delivered 29 to the information processing mechanism. It is appreciated that additional destinations and routings for signals are possible but are not included in FIG. 2 for visual simplification.

The information processing mechanism 30 delivers its signal output 31 to a signal output switch 32 controlled via an apparatus which is schematically indicated 37. From the signal output switch 32, signal information is routed 33, 34 to either the optical transmitter 25 and/or the RF transmitter 27. Optionally, the information processing mechanism 30 delivers additional signal information 38 to the control apparatus 37 and delivers additional signal information to the energy receivers 13, 17 and energy transmitters 25, 27 to alter their respective characteristics. The information processing mechanism 30 may simply deliver an arbitrary number which had been recorded at time of manufacture or recorded at some later time. Alternatively, the information processing mechanism 30 may contain more elaborate informational functions such as encryption, computation, environmental measurement and the like, as are commonly found resident on conventional RFID tags.

The optical transmitter 25 receives power 24 and signal 33 as described above. It produces an outgoing optical signal 35 which is detected by an external interrogation device. The RF transmitter 27 receives power 26 and signal 34 as described above. It produces an outgoing RF signal 36 which is detected by an external interrogation device.

An apparatus 37 is provided to control the characteristics and activation of functional modules of the O/RFID tag. Indicated in FIG. 2 are power controllers 20, 23 and signal switches 28, 32 controlled by the apparatus 37. The apparatus 37 can be reversibly or irreversibly programmed at the time of manufacture or at some later time. Optionally, information provided 38 by the information processing mechanism 30 can be used to program the apparatus 37. It is appreciated that additional sources and routings for information to be used to program the apparatus are operative herein.

Figure 3:
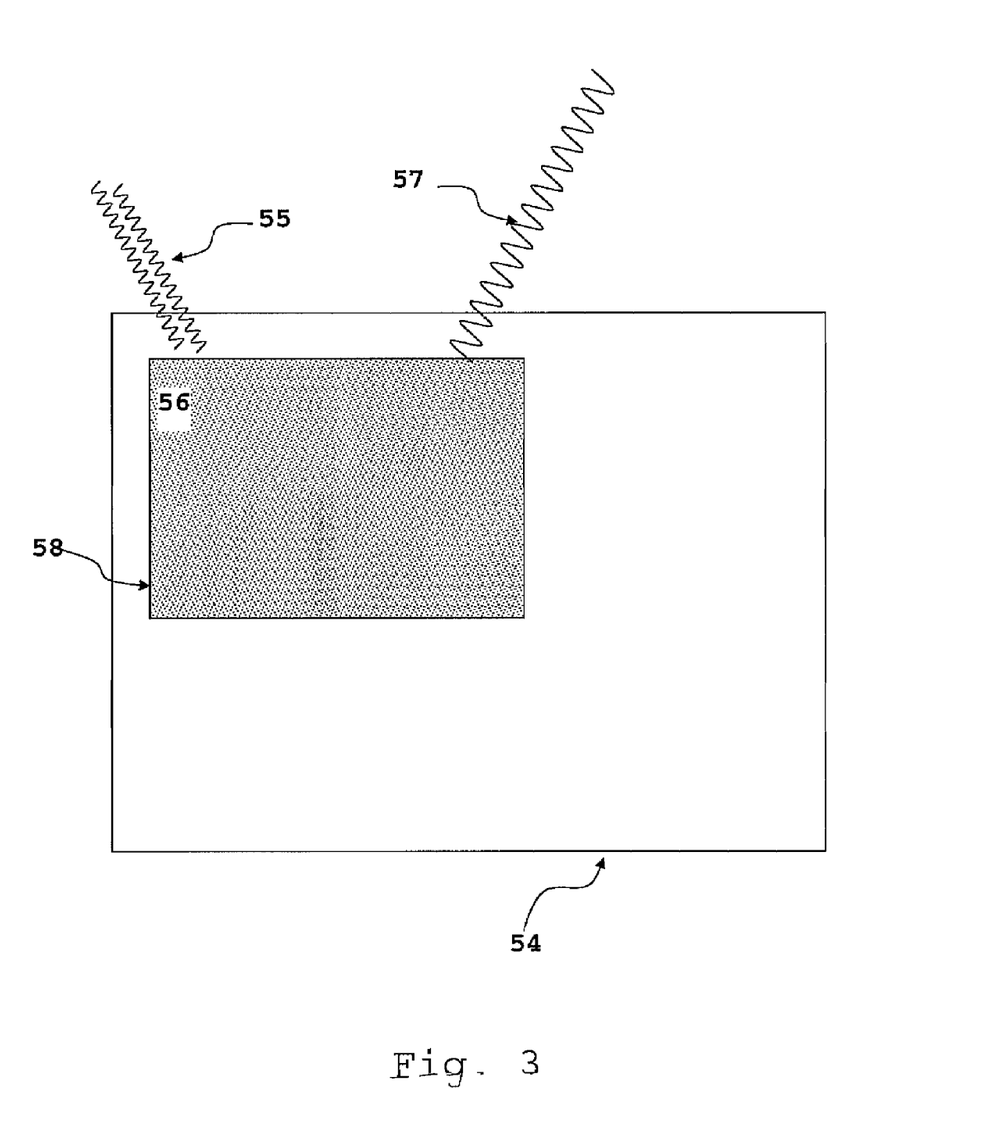
FIG. 3 is a schematic diagram of an alternate embodiment of the invention operating as a passive optical identification tag.

In an alternate embodiment depicted with respect to FIG. 3, a passive optical identification tag is shown generally at 54. An incoming optical signal 55 is provided of a wavelength ranging from ultraviolet through visible to infrared. The source of the incoming optical signal 55 is appreciated to be monochromatic, for example a laser or photodiode, or polychromatic, as obtained from an incandescent light source. The passive optical identification tag 54 includes an optical retroreflective transponder 56 that interacts with the incoming optical signal 55 to return a reflected output signal 57 communicating an identification code therewith. Methods of encoding a tag with a unique code illustratively include the deposition of bandpass filter coatings onto a reflective surface of the passive optical identification tag 54; the placement of one or more dye molecules onto a surface 58 of the transponder 56, the dye molecules being stimulated by the incoming optical signal 55 so as to emit a characteristic reflection wavelength, fluorescence, or phosphorescence; and scoring the reflective surface 58 to create light scattering of an incoming optical signal of a predetermined magnitude.

A passive optical identification tag 54 interrogated by a polychromatic light source coated with at least one optical bandpass filter material upon reflection of an incoming optical signal 55 will return a reflected optical signal 57 with only portions of the incident incoming optical signal 55 being present. Typical channel band centers for miscible light filters are 450 nanometers and progressing at 50 nanometer increments so as to create channel bandwidths of approximately 20 nanometers. Based on the filter bandwidth and the number of coatings available, used in combination with the polychromatic light source, an inventive passive optical tag is capable of encoding dozens of unique descriptor codes. The production of a bandpass passive optical identification tag according to the present invention is readily accomplished through the coating of a reflective metal or semiconductor substrate having a known reflectivity with layers of optical filter coatings. It is appreciated that the substrate is in the form of a wire, wafer, or particle. Organic optical filter coatings are readily applied through dip or spin coating, while inorganic optical filter coatings are typically applied through chemical vapor deposition, physical vapor deposition, or sputter coating. In the case of a wire or wafer substrate, the substrate is thereafter divided to be sized on the order of 1 to 500 microns. It is further appreciated that the passive optical tag is readily encapsulated within a protective coating that if optically transparent allows for interrogation of the passive optical identification tag 54 or alternatively is removed upon recovery of the tag and prior to incoming optical signal interrogation.

A passive optical identification tag according to the present invention coated with dye molecules having characteristic absorption, fluorescent, or phosphorescent signatures are prepared in a like manner to those described above having optical bandpass coatings thereon. It is appreciated that a passive optical identification tag according to the present invention is readily produced that has a combination of preselected dye molecules coated thereon and bandpass filters. Dye molecules operative herein include any organic, inorganic, or organometallic compound that is not ubiquitous to the tag environment, has a degradation lifetime in the tag environment on a timescale suitable for labeling, and a known absorption and/or emission spectrum under incoming optical signal illumination. With the use of dye species, it is appreciated that the passive optical identification tag need not be reflective, and instead a porous silica, aerogel, or colloidal substrate containing dye molecules is operative herein. In the instance of dye labeled passive optical tags, it is appreciated that time resolve labeling is readily accomplished with a dye having a comparatively short lifetime in the tag environment prior to degradation. Through application of Beer's Law and a known initial quantity of dye associated with the tag, the time from labeling until interrogation is readily extrapolated subject to variations in tag environment and individual tag exposures. Alternatively, temporal labeling of a tag is provided by varying the quantity of each of two or more dyes that are applied to a particular tag in a preselected amount that varies with time. The relative signals received from interrogating the tag are then correlated with the concentration of each dye present in order to extract the time of label. It is appreciated that a passive optical tag including dye species is interrogated with either monochromatic or polychromatic incoming optical signals, depending on the physical property by which a returned optical signal is generated.

A passive optical tag having a light scattering grating associated therewith is preferably formed by lithographic etching of a reflective metal or semiconductor substrate. However, it is appreciated that a grating structure is readily cast onto a wafer substrate using a grating mold as is common to the optical arts. With a grating type passive optical identification tag, the measure of the incident incoming optical signal relative to the reflected optical signal at a preselected angular orientation is sufficient to read the code from a given optical tag. It is appreciated that an optical grating type passive optical identification tag is operative alone or in combination with bandpass filter coatings and/or dye species associated therewith. Additionally, as detailed above, a grating type passive optical identification tag is readily encapsulated to protect the grating structure until such time as interrogation is intended.

A passive optical identification tag interrogation system as detailed above includes a monochromatic or polychromatic light source. Interrogation of the reflected optical signal from a tag is preferably accomplished with a spectrophotometer. Owing to the small size of an individual inventive tag, interrogation from a field of view potentially containing a large number of tags is readily accomplished with a microscope delivering instant light and receiving reflected light by way of optical fibers. In this way, a taggant is spatially resolved within a field. Placing the optical stage and optic system under the control of a computer operating an algorithm to identify tags within the optical field affords automated interrogation of tags within the field. Coupling the motor driven and computer controlled stage with a robotic arm capable of placing sample slides from the stage allows for the automated screening of samples with the interrogation of tags found on each of the samples.

Figure 4:
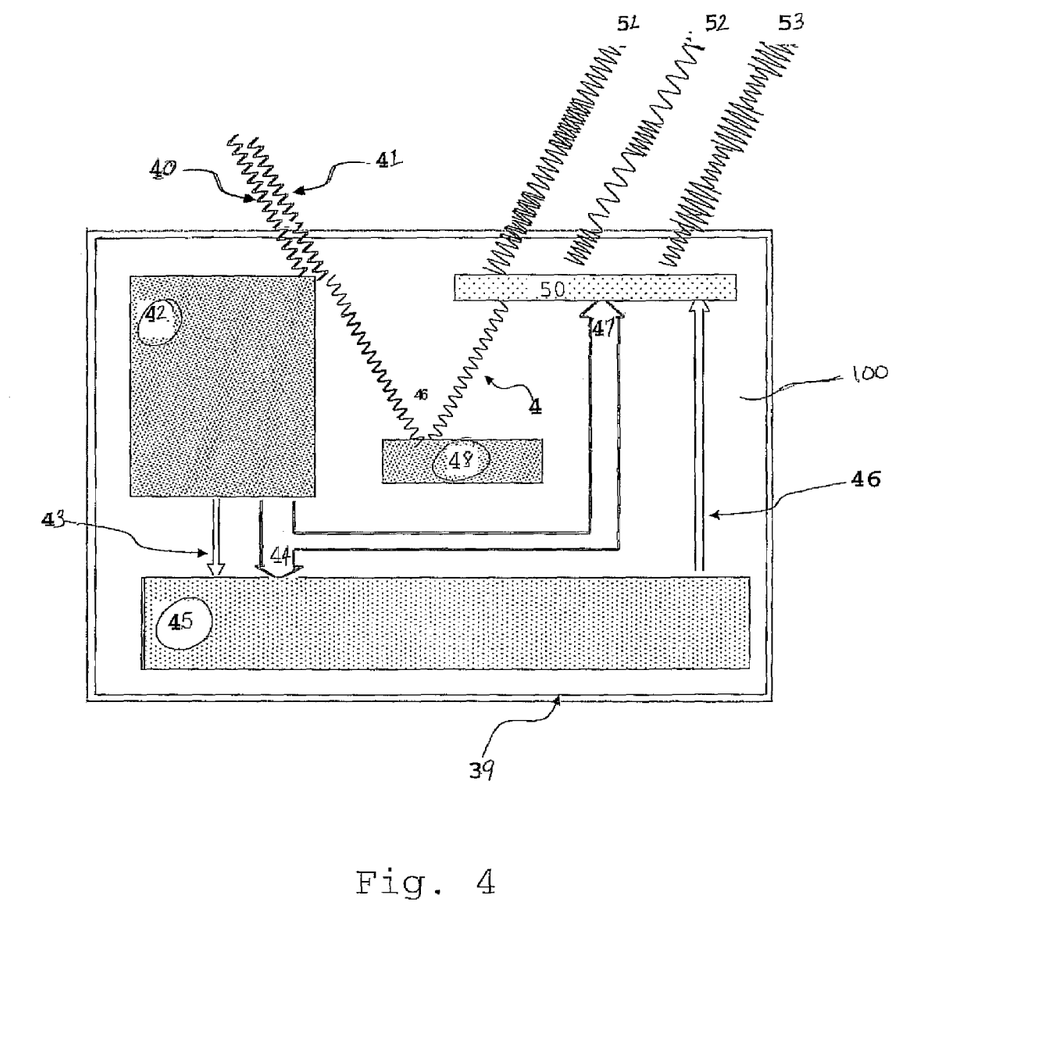
FIG. 4 is a schematic diagram of an alternate embodiment of the invention operating as an optical transponder-equipped ID (OID) tag differing from that embodiment depicted in FIG. 1 in that the outgoing optical signal is produced by reflecting and modulating the incoming optical signal rather than being produced de novo.

Depicted in FIG. 4 is an alternate embodiment of the invention as depicted in FIG. 1 in which is substituted, for the outgoing optical transmitter identified as component 9 in FIG. 1, a reflector 48 and an optical modulator 50. A substrate 39 is provided which carries the components of the optical identification (OID) tag. The method of manufacture is preferably a monolithic integrated circuit; yet various other methods of manufacture are operative herein.

An incoming optical signal 40, 41 is of wavelengths ranging from ultraviolet through visible to infrared. Its external source is monochromatic, for example a laser or photodiode, or polychromatic. One portion of the incoming optical signal 40 is captured by a optical energy receiver 42 and another portion of the incoming optical signal 41 strikes a reflective surface 48 and ten continues on 49 to be modulated by an optical beam modulator 50. An outgoing optical signal 51, 52, 53 is of wavelengths ranging from ultraviolet through visible to infrared. The optical reflector 48 may be integrated with the other components in a monolithic structure or may be external to the other components. The optical modulator 50 may be integrated with the other components in a monolithic structure or may be external to the other components. The modulator 50 may be transmissive as depicted in Fig 4 or may be reflective (not illustrated). Should the modulator be reflective, then its function can be merged with that of the reflector 48 to provide a combination reflector/modulator (not illustrated). The optical modulator encodes information on the outgoing reflected optical signal 51, 52 or 53 by varying any combination of the phase, wavelength, and/or intensity of the incoming signal 41. There is no requirement that the operating wavelength of the incoming optical signal and the outgoing optical signal be the same or different. Both the incoming optical signal 40, 41 and the outgoing optical signal 51, 52, 53 pass through an optional encapsulation 100 of the OID. Said encapsulation 100 is optically transparent at the wavelengths appropriate to the combination of the incoming optical signal 40, 41 and the optical energy receiver 42 as well the combination of the optical reflector 48, optical modulator 50 and the outgoing optical signal 51, 52, 53. The encapsulation 100 is optionally partially or completely during use. Optionally, the encapsulation 100 may be opaque with a window transparent at the corresponding wavelengths provided in the field of view of the optical energy receiver 42, optical reflector 48 and the optical modulator 50. Optionally, optical filtering (not illustrated) may be incorporated.

The optical energy receiver 42, containing a photosensitive structure, a coupling mechanism, a signal demodulator and an optional contained energy storage device, permits both power 44, 47 and signal 43 to be derived from a portion of the incoming optical energy 40. The power derived from the incoming optical energy is available to energize the mechanisms of the transponder as illustratively indicated by 44, indicating energy delivery to the information processing mechanism 45, and by 47 indicating energy delivery to the optical modulator 50. The information processing mechanism 45 according to the present invention is encoded with information through techniques conventional to microelectronics and represents either physical or programmed encoding. Tag encoding illustratively includes a mechanism fashioned as an EPROM, uploaded software, and reconfigurable signal and/or power routing. Additional destinations (not illustrated) and routings (not illustrated) for the power are possible but are not included in FIG. 4 for visual simplification. The signal 43 is delivered to the information processing mechanism. Optionally, additional signals (not illustrated) are channeled directly between the optical energy receiver 42 and the optical modulator 50. It is appreciated that additional destinations (not illustrated) and routings (not illustrated) for the signal are possible but are not included in FIG. 4 for visual simplification.

The information processing mechanism 45 delivers its output 46 to the optical modulator 50 and, optionally, delivers feedback information (not illustrated) to the optical energy receiver 42 to alter the characteristics of the optical energy receiver 42. Additional destinations (not illustrated) and routings (not illustrated) for the information are possible but are not included in FIG. 4 for visual simplification. The information processing mechanism 45 may simply deliver an arbitrary number that had been recorded at time of manufacture or recorded at some later time. Alternatively, the information processing mechanism 45 may contain more elaborate informational functions such as encryption, computation, environmental measurement and the like, as are commonly found resident on prior art RFID tags. It is appreciated that conventional information processing mechanisms are operative herein.

The optical modulator 50 receives power 47 and signal 46 as described above. Additional sources (not illustrated) and routings (not illustrated) for the power are possible but are not included in FIG. 4 for visual simplification. It produces an outgoing optical signal 51 which is detected by an external interrogation device.

In another alternate embodiment a reflector and an optical modulator, such as those described with respect to components 48 and 50 of FIG. 4, are substituted for the outgoing optical transmitter identified as component 25 in FIG. 2.

An interrogation device, external to the inventive tag, is provided. In one embodiment, mechanical guides hold a tag or a tagged item in a predetermined location and orientation. A laser illuminates the same predetermined position and a photodetector receives the outgoing optical signal. Further information processing is by conventional means. An alternate embodiment of the external interrogation device allows the interrogating laser beam to scan a range of positions in a space filling pattern. Optionally optical elements may be incorporated into the tag or the surface of the tagged item in order to simplify the recognition of the tag. Once the tag is located, further transmission and reception of optical signals proceeds as above. In an additional embodiment of the invention, optical means of interrogation can be combined with other means of interrogation including optical barcode, radiofrequency, acoustic and magnetic technologies. Other forms and configurations of external interrogating devices are possible and are included within this invention.

An inventive tag has met with considerable acceptance in situations where there is no tolerance for ambiguity as to the identity of the tag being read. The following exemplary usage further illustrates these advantages.

In a medical setting such as an emergency room where patients in close proximity each wear a data storing identification bracelet. A radiofrequency transponder-RFID tag system leaves some ambiguity as to which of a number of proximal tags is in fact being read, resulting in the need for a mode of confirmation. Absent a mode of confirmation, the potential of communicating information vital to the treatment of a patient that actually belongs to a second patient creates an opportunity for incorrect and possibly life-threatening treatment. An inventive tag using a laser reader to provide an optical input interrogation signal enters an inventive tag with greater spatial specificity than a radiofrequency broadcast yet independent of the geometric constraints associated with a barcode reader. In response to an inventive tag being read, an optical emission from the tag is provided of the same or different color as compared to the interrogating laser signal. Preferably, if the tag confirmation optical signal is of different wavelength than the interrogation laser signal, the confirmation signal is of a longer wavelength than the laser interrogation signal. Optionally, the confirmation signal emitted from the tag is pulsatile.

A patient bracelet incorporating an inventive tag optionally is integrated into an active patient bracelet having as a power source a battery or a photovoltaic so as to provide additional functions including an active repeater without limitation to energy input being derived solely from an interrogating laser signal.

Optionally, lens components are incorporated into the bracelet overlying an optical energy receiver portion of an inventive tag so as to direct non-incident laser interrogation signals into an inventive tag.

Patents and publications mentioned in the specification are indicative of the levels of those skilled in the art to which the invention pertains. These patents and publications are incorporated herein by reference to the same extent as if each individual application or publication was specifically and individually incorporated herein by reference.

The foregoing description is illustrative of particular embodiments of the invention, but is not meant to be a limitation upon the practice thereof. The following claims, including all equivalents thereof, are intended to define the scope of the invention.

The invention claimed is:

1. An identification tag comprising:
    a substrate having a dimension from 1 to 500 microns having at least one optical coating scheme selected from a group consisting of: a bandpass filter comprising at least two bandpass regions and dye molecules;
    an information processing mechanism on said substrate and containing a datum;
    an interrogating signal receiver for receiving an energy input outside the radiofrequency range and of light ranging from ultraviolet through infrared comprising a signal demodulator and a contained energy storage device, the energy input powering said information processing mechanism and said output signal transmitter; and
    an output signal transmitter for communicating said datum external to said substrate as an emission outside the radiofrequency range.

2. The identification tag of claim 1 wherein said substrate is an integrated circuit.

3. The identification tag of claim 1 wherein said receiver receives an optical energy input and said transmitter emission is optical.

4. The identification tag of claim 1 further comprising an encapsulant encompassing said substrate.

5. The identification tag of claim 4 wherein said encapsulant is opaque and further comprises a transparent window.

6. The identification tag of claim 1 further comprising a radiofrequency energy receiver yielding an RF power input and RF signal input, and a power control apparatus.

7. The identification tag of claim 6 further comprising a radiofrequency energy transmitter receiving power via said power control apparatus and transmitting a radiofrequency signal indicative of said datum.

8. The identification tag of claim 6 further comprising an encapsulant encompassing said substrate.

9. The identification tag of claim 8 wherein said encapsulant is opaque and further comprises a transparent window.

10. A process for reading the identification tag of claim 1 comprising the steps of:
 receiving a non-radiofrequency input signal and deriving primary power therefrom;
 interrogating an information processing mechanism with said primary power for a datum stored therein; and
 transmitting from the tag a non-radiofrequency output signal indicative of said datum.

11. The process of claim 10 further comprising the step of:
 compiling said non-radiofrequency input signal with an RF signal received from a radio frequency receiver.

12. The process of claim 11 wherein secondary power is derived from said RF signal.

13. The process of claim 12 further comprising the step of:
 controlling movement of said primary and secondary powers to said information processing mechanism with a power control apparatus.

14. An identification tag comprising:
 a substrate having a dimension from 1 to 500 microns having at least one optical coating scheme selected from a group consisting of: a bandpass filter, dye motecules, and grating scores;
 wherein said bandpass filter comprises at least two bandpass regions.

15. A process for reading a passive identification tag comprising the steps of
 exposing an identification tag to an input optical signal, said tag comprising: a substrate having a dimension from 1 to 500 microns having at least one optical coating scheme selected from a group consisting of: a bandpass filter having at least two bandpass regions and dye molecules; an information processing mechanism on said substrate and containing a datum; an interrogating signal receiver for receiving an energy input outside the radiofrequency range and of light ranging from ultraviolet through infrared comprising a signal demodulator and a contained energy storage device, the energy input powering said information processing mechanism and said output signal transmitter; and an output signal transmitter for communicating said datum external to said substrate as an emission outside the radiofrequency range; and
 comparing the spectral reflections from said tag relative to a library of tag optical spectra.

16. The process of claim 15 wherein the input optical signal is monochromatic.

17. The process of claim 15 wherein the input optical signal is polychromatic.

18. A process for reading a passive identification tag comprising the steps of:
 exposing an identification tag to a monochromatic input optical signal, said tag comprising a substrate having a dimension from 1 to 500 microns having at least one optical coating scheme selected from the group consisting of a bandpass filter, dye molecules, and grating scores;
 comparing the spectral reflections from said tag relative to a library of tag optical spectra; and
 applying a first dye with a first finite lifetime to determine temporal labeling.

19. The process of claim 18 further comprising the step of applying a second dye with a second finite lifetime that varies relative to the first finite lifetime.

20. An information exchange system comprising:
 a reader emitting a laser interrogation signal ranging from ultraviolet through infrared and having an optical receiver;
 an identification tag comprising:
 a substrate having a dimension from 1 to 500 microns having at least one optical coating scheme selected from a group consisting of: a bandpass filter comprising at least two bandpass regions and dye molecules;
 an information processing mechanism on said substrate and containing a datum;
 an interrogating signal receiver for receiving the laser interrogation signal;
 an output signal transmitter for communicating said datum as an optical signal to said optical receiver derives power from the laser interrogation signal for communicating said datum; and
 a light emitter activated by communicating said datum.

21. The system of claim 20 wherein said identification tag is integral with a bracelet.

22. The system of claim 21 wherein said bracelet further comprises a power source coupled to said identification tag.

23. The system of claim 21 wherein said bracelet further comprises a lensing element intermediate between said laser interrogation signal and said signal receiver.

24. The system of claim 20 wherein said light emitter is pulsatile.

25. The system of claim 20 wherein said light emitter is of a longer wavelength than said laser interrogation signal.

* * * * *

UNITED STATES PATENT AND TRADEMARK OFFICE
CERTIFICATE OF CORRECTION

PATENT NO. : 7,652,557 B2 Page 1 of 1
APPLICATION NO. : 11/056808
DATED : January 26, 2010
INVENTOR(S) : Kantrowitz et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 945 days.

Signed and Sealed this

Twenty-third Day of November, 2010

David J. Kappos
*Director of the United States Patent and Trademark Office*